United States Patent [19]

Brailean et al.

[11] Patent Number: 5,724,369
[45] Date of Patent: Mar. 3, 1998

[54] METHOD AND DEVICE FOR CONCEALMENT AND CONTAINMENT OF ERRORS IN A MACROBLOCK-BASED VIDEO CODEC

[75] Inventors: James C. Brailean, Park Ridge; Kevin J. O'Connell, Palatine; Mark R. Banham, Arlington Heights; Stephen N. Levine, Itasca, all of Ill.

[73] Assignee: Motorola Inc., Schaumburg, Ill.

[21] Appl. No.: 548,772

[22] Filed: Oct. 26, 1995

[51] Int. Cl.$^6$ ..................................................... H04L 1/00
[52] U.S. Cl. ............................................ 371/31; 348/616
[58] Field of Search ........................... 371/31; 348/402, 348/416, 616; 358/336

[56] References Cited

U.S. PATENT DOCUMENTS

| | | | |
|---|---|---|---|
| 5,243,428 | 9/1993 | Challapali et al. | 358/167 |
| 5,247,363 | 9/1993 | Sun et al. | 358/167 |
| 5,436,664 | 7/1995 | Henry | 348/402 |
| 5,446,456 | 8/1995 | Seo | 341/118 |
| 5,491,509 | 2/1996 | Jeong et al. | 348/402 |
| 5,493,513 | 2/1996 | Keith et al. | 364/514 R |
| 5,552,831 | 9/1996 | Machida et al. | 348/416 |

OTHER PUBLICATIONS

Haskell, P. et al., "Resynchroization of Motion Compensated Video Affected by ATM Cell Loss", Int'l. Conf. on Acoustics, Speech and Signal Processing, pp. III-545 to III-548, Jan. 1992.

Masoud Khansari, Awais Zakauddin, Wai-Yip Chan, Eric Dubois and Paul Mermelstein, "Approaces to Layered Coding for Dual-Rate Wireless Video Transmission", IEEE 1994 pp. 1-5.

Thomas P. O'Rourke, robert L. Stevenson, Yih-Fang Huang, Lance C. Perez and Daniel J. Costello Jr. "Robust Transmission of Compressed Images over Noisy Gaussian Channels", IRRR 1995 pp. 2319-2322.

M. Khansari, A. Jalali, E. Dubois and P. Mermelstein, "Robust Low Bit-Rate Video Transmission over Wireless Access Systems", IEEE 1994 pp. 571-575.

Wai-Man Lam and Amy R. Reibman "an Error Concealment Algorithm for Images Subject to Channel Errors", IEEE 1995 pp. 533-542.

Huifang Sun and Wilson Kwok, David Sarnoff Research Center. "Error Concealment with Directional filtering for Block Transform Coding", IEEE 1993 pp. 1304-1308.

Klaus Illagner and Dirk Lappe "Mobile multimedia communications in a universal telecommunications network", SPIR Vlol 2501 pp. 1034-1043.

*Primary Examiner*—Stephen M. Baker
*Attorney, Agent, or Firm*—Darleen J. Stockley

[57] ABSTRACT

The present invention provides a method (100, 200) and a device (300, 400, 600) for containing and concealing errors which occur in a transmitted video bitstream. Utilizing a plurality of predetermined scanning patterns, particular macroblocks are chosen per frame to have their intensity information encoded and transmitted. This approach provides an efficient method to limit the degradation to the visual quality of a video sequence decoded from a bitstream corrupted by an extended error burst. Concealment of areas within a video sequence that are affected by short error bursts and/or random errors is achieved by estimating the corresponding lost macroblock information from the remaining uncorrupted macroblocks. That is, for each lost macroblock a prediction of the intensity information is generated through the use of a motion vector from a neighboring uncorrupted macroblock.

15 Claims, 4 Drawing Sheets

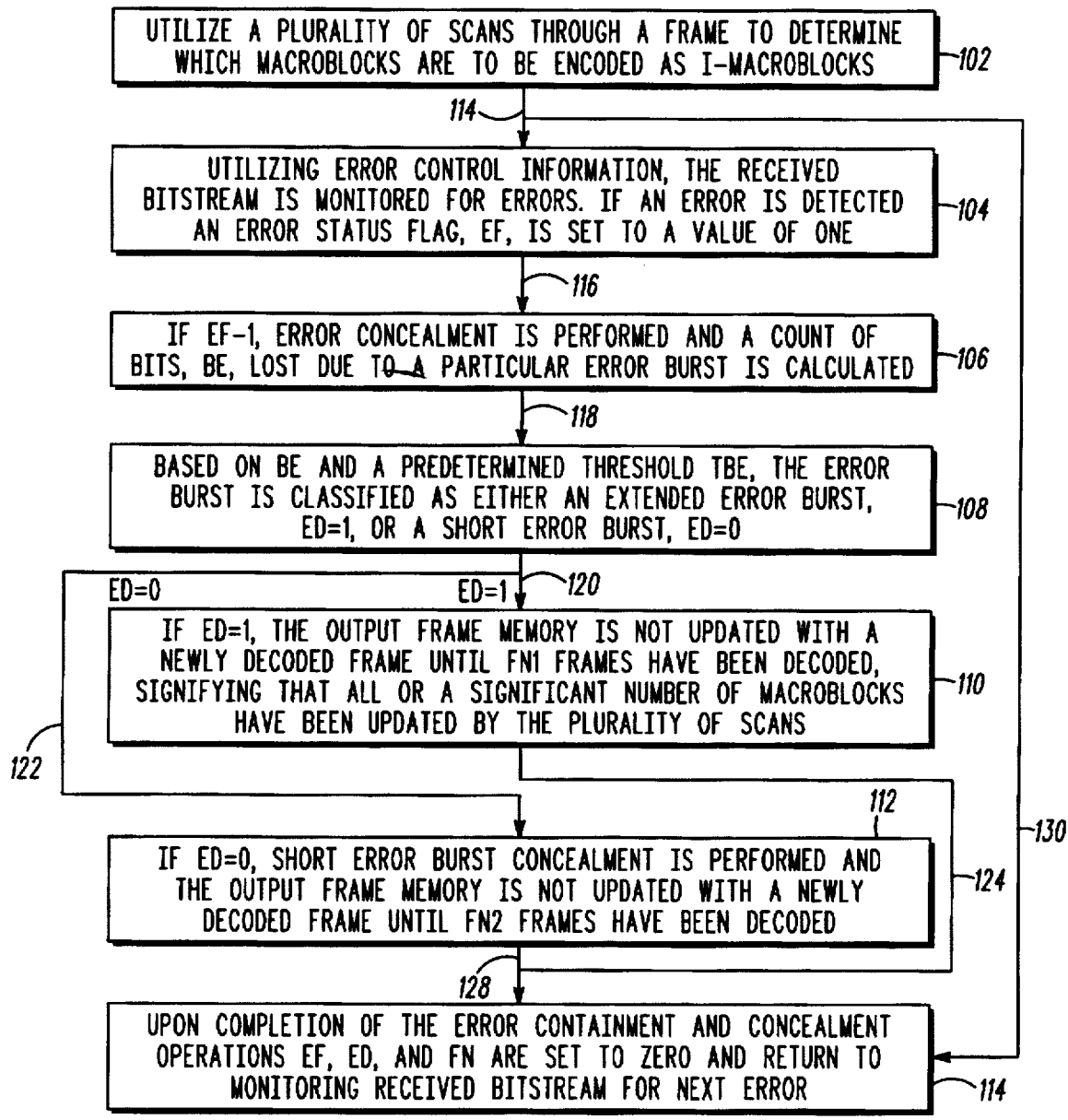

- GENERATE AN ERROR MAP INDICATING WHICH MACROBLOCKS ARE RECEIVED IN ERROR — 202
- UTILIZING THIS ERROR MAP AND A RASTER SCAN PROCEED TO THE FIRSY CORRUPTED MACROBLOCK — 204
- CREATE A PLURALITY OF CANDIDATE MOTION VECTORS — 206
- UTILIZE EACH CANDIDATE MOTION VECTOR TO GENERATE A PREDICTION OF THE CORRUPTED MACROBLOCK BY MOTION COMPENSATING THE PREVIOUSLY DECODED FRAME — 208
- CALCULATE THE MEAN SQUARED ERROR ON THE BORDERS, MSE, BETWEEN EACH PREDICTED MACROBLOCK AND THE NEIGHBORING MACROBLOCKS THAT HAVE BEEN RECEIVED WITHOUT ERRORS OR REGENERATED — 210
- UPDATE ERROR MAP TO INDICATE THAT CURRENT BLOCK HAS BEEN CONCEALED. MOVE TO THE NEXT CORRUPTED MACROBLOCK — 212

FIG.3

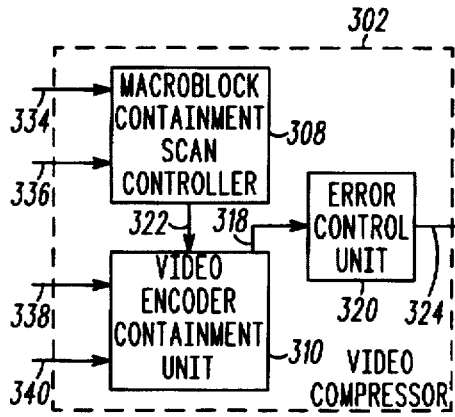
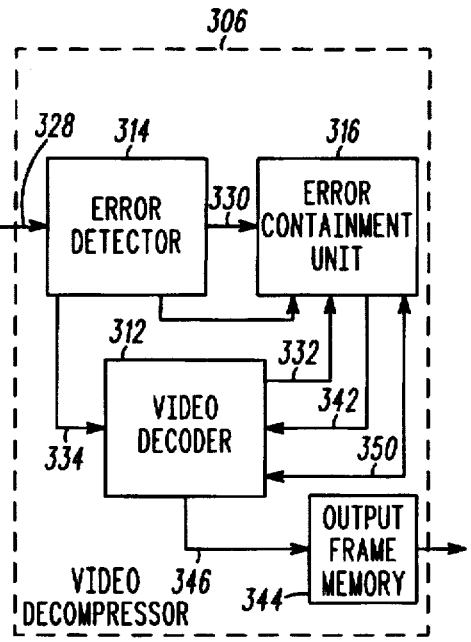

METHOD AND DEVICE FOR CONCEALMENT AND CONTAINMENT OF ERRORS IN A MACROBLOCK-BASED VIDEO CODEC

FIELD OF THE INVENTION

The present invention relates generally to image and video coding and more particularly to concealment and containment of errors in macroblock-based video codecs.

BACKGROUND OF THE INVENTION

The widespread use of digital video conferencing and multimedia information over bandwidth limited channels witnessed today is the result of the introduction of video compression standards such as H.261, H.263, MPEG1, and MPEG2. Utilizing the video codecs specified by these standards, applications such as videoconferencing, telecommuting, and telepresence are becoming common place in the business community. Furthermore, authors of multimedia are able to compress their digital video to data rates that allow this material to be transmitted over a variety of communication networks or stored onto an electronic medium, such as a compact disc. The compression techniques employed by these standards attempt to remove all redundancy that exists within the video information. This is accomplished by reducing the video to its most essential informational components. It is from these components that the video decoder constructs the decoded video for use in the above mentioned applications.

The video codecs specified by the standards provide compression of a digital video sequence by utilizing a block motion-compensated Discrete Cosine Transform, DCT, approach. This video encoding technique removes the redundancy present in a video sequence by utilizing a two-step process. In the first step, a block-matching, BM, motion estimation and compensation algorithm estimates the motion that occurs between two temporally adjacent frames. The frames are then compensated for the estimated motion and compared to form a difference image. By taking the difference between the two temporally adjacent frames, all existing temporal redundancy is removed. The only information that remains is new information that could not be compensated for in the motion estimation and compensation algorithm.

In the second step, this new information is transformed into the frequency domain using the DCT. The DCT has the property of compacting the energy of this new information into a few low frequency components. Further compression of the video sequence is obtained by limiting the amount of high frequency information encoded.

The majority of the compression provided by this approach to video encoding is obtained by the motion estimation and compensation algorithm. That is, it is much more efficient to transmit information regarding the motion that exists in a video sequence, as opposed to information about the intensity and color. The motion information is represented using vectors which point from a particular location in the current intensity frame to where that same location originated in the previous intensity frame. For BM, the locations are predetermined non-overlapping blocks of equal size called macroblocks, MB. All pixels contained in an MB are assumed to have the same motion. The motion vector associated with a particular MB in the present frame of a video sequence is found by searching over a predetermined search area in the previous temporally adjacent frame for a best match. This best match is generally determined using the mean-squared-error (MSE) or mean-absolute-difference (MAD) between the two blocks. The motion vector points from the center of the MB in the current frame to the center of the block which provides the best match in the previous frame.

Utilizing the estimated motion vectors, a copy of the previous frame is altered by each vector to produce a prediction of the current frame. This operation is referred to as motion compensation. As described above, each predicted MB is subtracted from the current MB to produce a difference MB which is transformed into the spatial frequency domain by the DCT. These spatial frequency coefficients are quantized and entropy encoded providing further compression of the original video sequence. The motion vectors are compressed using differential pulse code modulation, DPCM, and entropy encoding. Both the motion vectors and the DCT coefficients are transmitted to the decoder, where the inverse operations are performed to produce the decoded video sequence.

Applying this approach, the video codecs specified by the standards are very efficient at removing all but the very essential information from a digital video sequence. Unfortunately, such efficient compression reduces the robustness of the data being transmitted. That is, since each component of information, or bit, is essential to the ability of the decoder to reconstruct the video, an error in any one bit would result in a portion of the video being constructed incorrectly. The above mentioned standards provide mechanisms for detecting and correcting errors in the received video bitstream; however, they do not address the situation when errors are detected but not corrected, or worse, the case when errors are neither detected nor corrected. As mentioned above, due to the importance of each data bit of the compressed video, an error will result in large portions of the decoded video being reconstructed incorrectly. Therefore, it is crucial for the video decoder to have the ability to conceal these portions of the video from the viewer. It also equally important that the video encoder provide a mechanism that ensures these errors will be contained to the affected area and not allowed to propagate through the video sequence.

Prior art for error concealment is limited to an approach which attempts to conceal a macroblock (MB) received in error by simply predicting it using the motion vector of the MB in the row directly above it (as long as that MB is error free). This approach has several problems. First, no consideration is given to whether the motion vector of the above MB is a good prediction of the actual motion vector that was lost. Also, not considering the how this predicted MB will interact with the neighboring error free MBs will result in large blocking artifacts. Lastly, considering only error free MBs in regenerating motion vectors is likely to introduce artificial boundaries between the erroneous MBs when operating in a burst error environment due to the fact that several rows of MBs will be affected by the burst. However, this proposed method for error concealment will treat these rows differently, introducing these artificial boundaries.

BRIEF DESCRIPTION OF THE DRAWINGS

FIG. 1 is a flow diagram of a preferred embodiment of steps of a method for containment and concealment of errors occurring in a bitstream using control information for a macroblock-based video codec in accordance with the present invention.

FIG. 2 is a flow diagram of a preferred embodiment of steps of a method for the concealment of errors occurring in a bitstream of a macroblock-based video codec in accordance with the present invention.

FIG. 3 is block diagram of a macroblock-based video compression system that utilizes a device for containment and concealment of errors in accordance with the present invention.

DETAILED DESCRIPTION OF A PREFERRED EMBODIMENT

Figure 4:
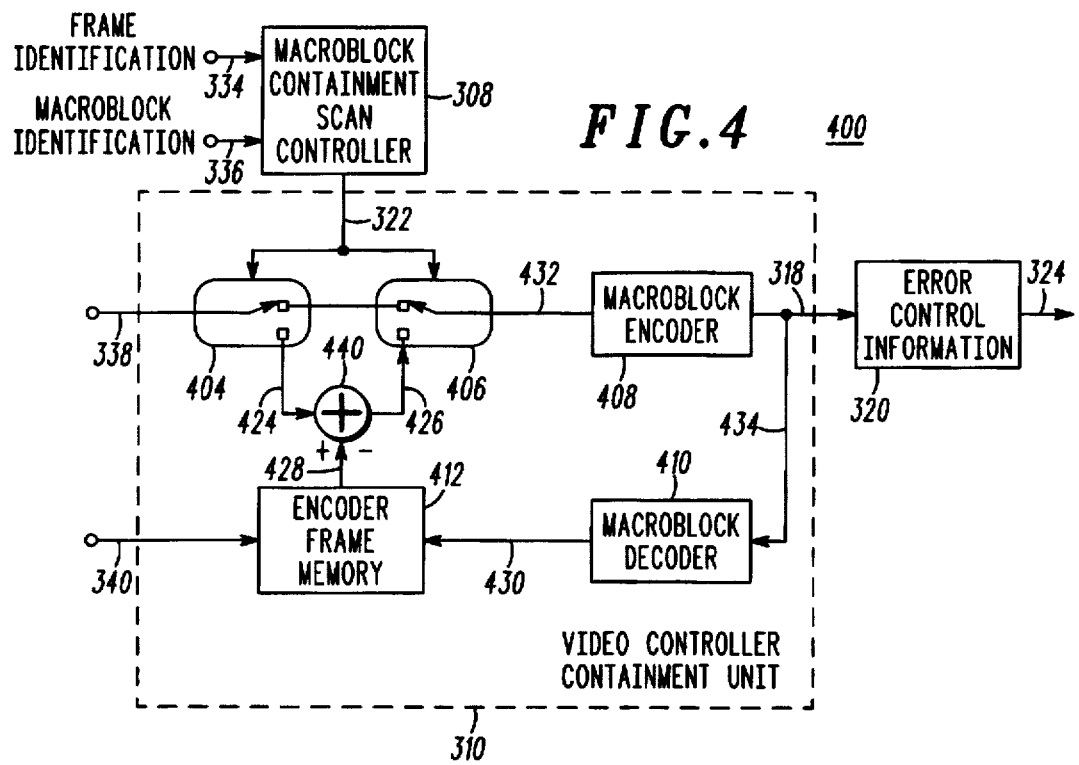
FIG. 4 is a block diagram of a device for containing errors in a decoded video sequence through resynchronization of a macroblock-based video codec in accordance with the present invention.

The present invention provides a method and a device to contain and conceal errors which occur in a transmitted video bitstream. Utilizing a plurality of predetermined scanning patterns, particular macroblocks are chosen per frame to have their intensity information encoded and transmitted. This approach provides an efficient method to limit the degradation to the visual quality of a video sequence decoded from a bitstream corrupted by an extended error burst. Concealing of areas within a video sequence that are affected by short error bursts and/or random errors is achieved by estimating the corresponding lost macroblock information from the remaining uncorrected macroblocks. That is, for each lost macroblock a prediction of the intensity information is generated through the use of a motion vector from a neighboring uncorrupted macroblock.

The present invention is more fully described with reference to FIGS. 1–6. FIG. 1, numeral 100 is a flow diagram of a preferred embodiment of a method for containment and concealment of errors occurring in a bitstream using control information for a macroblock-based video codec. The first step is to utilize a plurality of scanning paths through a frame to determine particular macroblocks to be encoded as intra-macroblocks (102). An intra or I-macroblock is a macroblock that is not predicted from the previous frame. Therefore, no motion vectors are associated with an I-macroblock and only the intensity information is encoded.

Next, utilizing the error control information, the received bitstream is constantly monitored for errors. If an error is detected an error status flag is set to the value one (104). The error status flag is used to indicated when error concealment is required (106). Also, once the error status flag is set to one, a count of the number of bits, BE, lost due to a particular error burst is obtained (106). Based on BE and a predetermined threshold, TBE, the error burst is classified as either an extended or small error burst (108). If an extended error burst is detected a second flag, ED, is set to one. If the burst is classified as a small error burst, then ED is set to zero.

In the extended error burst case, ED=1 (120), the output frame memory is not updated with a new decoded frame until a predetermined number, FN1, of frames have been decoded. This method of error containment ensures that all or a significant portion of the macroblocks have been updated by the plurality of I-macroblock scans prior to being displayed (110). Upon completion of the I-macroblock scans, the output buffer is updated with the current decoded frame. Furthermore, the ED flag is set to zero allowing the output frame memory to be updated with each newly decoded frame (114). Once these steps are completed the error concealment method returns to monitoring the received bitstream (130).

In the short error burst case, ED=0 (122), again the output frame memory is fixed with the last error-free video frame (112). Short error burst concealment is performed on the affected area (112). Upon completion of the short error burst concealment, the error status flag, EF, is reset to zero (114). Furthermore, after a predetermined number of frames, FN2, the output frame memory is updated with the current decoded frame (120). As described above, once these steps are completed the error concealment method returns to monitoring the received bitstream (130).

FIG. 2, numeral 200, is a flow diagram of a preferred embodiment of a method for short error burst concealment in accordance with the present invention. The first step is to generate a map indicating which macroblocks were received in error (202). Based on this map, the decoded image frame is traversed using a raster scan until the first erroneous macroblock is encountered (204). Next, a pool of possible motion vectors is generated using neighboring macroblocks which have been received and decoded without an error (206). Also included in this pool is the zero motion vector. Each motion vector is used to obtain a prediction of the current erroneous macroblock (208). The motion vector that provides a prediction of the erroneous macroblock which best matches the borders of the neighboring MBs (those not received in error) is chosen as the regenerated motion vector (210). The mean squared error between the border pixels of the neighboring error free macroblocks and a predicted macroblock is used as the criterion to determine this best match.

FIG. 3, numeral 300, is a block diagram of a video transmission system that utilizes a device for error concealment in accordance with the present invention. The video transmission system (300) includes a video compressor (302), a transmission channel (304), and a video decompressor (306). The video compressor (302) is made up of a video encoder containment unit (310), a macroblock containment scan controller (308), and an error control unit (320). The video decompressor includes an error detector (314), an error concealment unit (316), a video decoder (312) and an output frame memory (344).

The video compressor (302) utilizes as inputs a temporal reference (334), a macroblock position (336) within the frame, a video sequence (338), and a plurality of motion vectors (340). The temporal reference (334) provides a means of determining a frame's relative position within the video sequence. The temporal reference (334) in conjunction with the macroblock position information (336) is used by the macroblock containment scan controller (308) to determine which macroblock of the input video sequence (338) is to have only its intensity information encoded by the video encoder containment unit (310). As described above, this type of a macroblock is called an I-macroblock. That is, based on a plurality of predetermined scans at least one macroblock per scan is chosen to be updated with only intensity information. This is in contrast to the standard operation of the video encoder. Typically, a macroblock has a motion vector (340) associated with it that is used to generate from the previous frame a prediction of its intensity information. This prediction, as described above, is subtracted from the original macroblock, removing most of the temporal redundancy that exists in the video sequence. The updating of certain macroblocks based only on the intensity information provides an efficient method to contain errors that may have corrupted previously encoded frames. This is especially true since I-macroblocks are not dependent on the previously decoded information. The location of the macroblock to be encoded as an I-macroblock is incremented based on the temporal reference and the particular scans used.

A received bitstream (328) is the input to the video decompressor (306). However, due to the unreliable nature of the transmission channel (304) errors are introduced into the output bitstream (324). These errors result in particular bits of the received bitstream (328) differing from the corresponding bits in the output bitstream (324). If the video decoder were to blindly try to decode the received bitstream (328), these errors would have a disastrous effect on the visual quality of the resulting video. To avoid blindly decoding a corrupted bitstream, an error detector (314) is utilized to determine when errors are present in the received bitstream (324).

The error detector (314) utilizes the error control information placed in the output bitstream by the error control unit (320). If errors are detected in the received bitstream (328) the corrupted information is replaced by known information. Typically, this known information is a motion vector with a zero value and a prediction error of zero for each pixel in the replaced macroblock. Furthermore, if an error is detected the error detection unit (314) signals (330) the error concealment unit (316) to activate.

The error concealment unit (316) performs two functions. The first function is determining the severity of the errors that have been introduced into the bitstream. This is done by estimating the duration of the error burst. The duration of an error burst is calculated by counting the bits received between when an error is first detected and when the decoder regains synchronization, i.e., correctly decodes the next set of error control information. Based on the number of bits counted, an error burst is classified as either an extended burst or a short burst. If a short burst is detected the error concealment unit (316) utilizes both the motion vectors from the neighboring error-free macroblocks (332) as well as the intensity information from the previous frame (350) to regenerate the corrupted macroblock (342). If an extended burst is detected then the output buffer (344) is not updated until the I-macroblock scans are allowed to update the entire video frame. Once the I-macroblock scanning is complete the error is contained and the normal updating (346) of the output buffer (344) is allowed.

Figure 5:
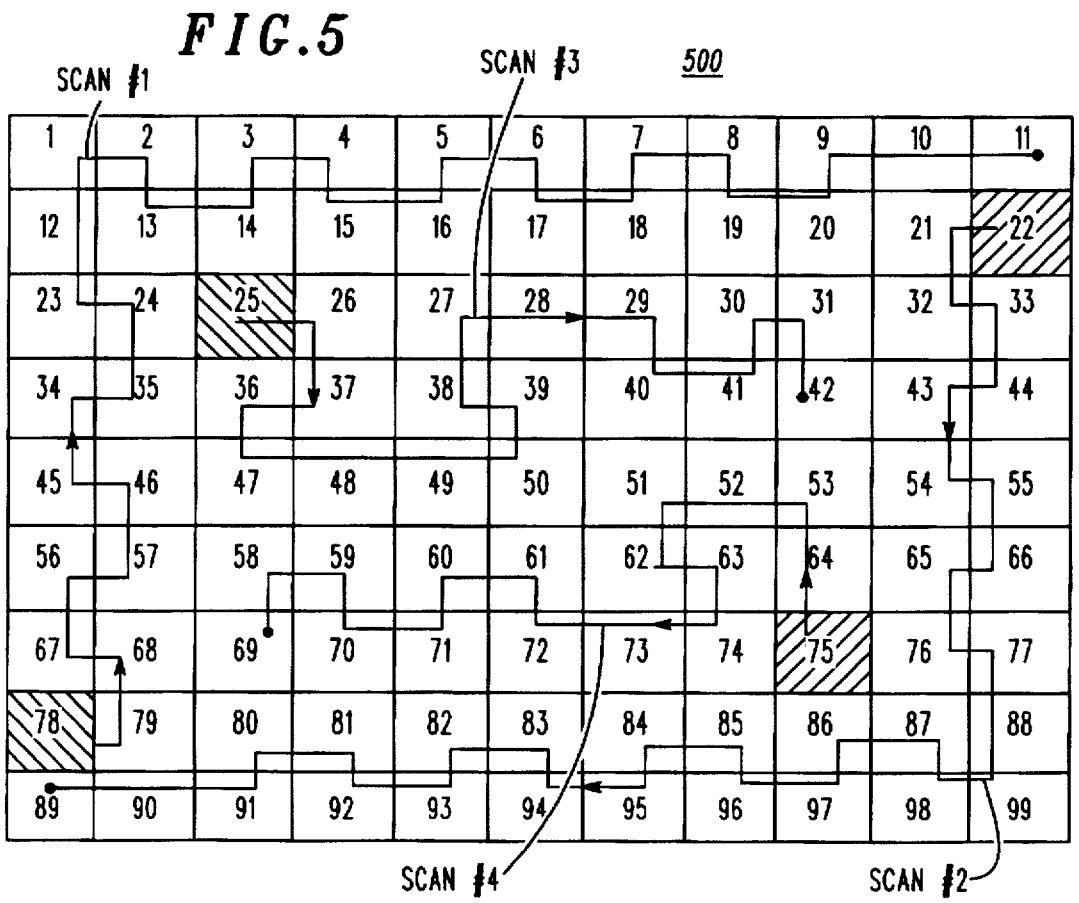
FIG. 5 is a diagram illustrating a plurality of scans within a frame of a video sequence.

FIG. 4, numeral 400, is a block diagram of the video compressor (302) which provides intensity information for error containment in accordance with the present invention. As discussed above, based on the temporal reference (334) and the position of a macroblock with regards to a particular scan, the macroblock containment scan controller (308) determines which macroblocks should be updated as I-macroblocks. A plurality of scans which provides very good error concealment is shown in FIG. 5, numeral 500. In this example, the resolution of the video frame is 176 picture elements, pixels, in the horizontal direction and 144 pixels in the vertical direction. The macroblocks, which are represented by the blocks, are assumed to be 16 pixels by 16 pixels. This assumption results in 99 macroblocks per frame as shown in FIG. 5. It should be noted that this is only one example of a particular implementation of these scans and that the present invention can be implemented with any size macroblock or set of scans. A nice feature of this particular set of scans is that the center of the image, wherein it is assumed that the object of interest resides, is updated at a much faster rate than the boarder macroblocks. By using this set of scans the output buffer (344) in the video decompressor is updated much faster then a conventional raster scan. This has the advantage of reducing the time required for error containment to be achieved for the extended error burst case.

If an input macroblock (338) is selected by the macroblock containment scan controller (308) to be encoded as an I-macroblock, then switch 1 (404) and switch 2 (406) are positioned so that the intensity information is passed (420) directly to (432) the macroblock encoder (408). After encoding, (318) error control information is added to the bitstream by the error control unit (320). Typically, this error control information signifies the start of a new picture frame and/or the beginning of a new group of macroblocks. Generally, a group of macroblocks is defined to be the macroblocks contained in one row of an image frame. The encoded bitstream is also passed (434) to a macroblock decoder (410) where it is decoded and stored (430) in the encoder frame memory (412) for use in predicting the next encoded frame.

If an input macroblock (338) is not chosen to be encoded as an I-macroblock, then switch 1 (404) and switch 2 (406) are positioned so that a prediction macroblock (428) is subtracted (440) from the current macroblock (424) and the difference signal (426) is passed (432) to the macroblock encoder (408). As described above for the I-macroblock case, error control information is added by the error control unit (320) to the encoded bitstream (318) prior to transmission (324) over the transmission channel (304). Also, the encoded bitstream (434) is decoded by the macroblock decoder (410) and stored (430) in the encoder frame memory (412) for use in predicting the next encoded frame.

Figure 6:
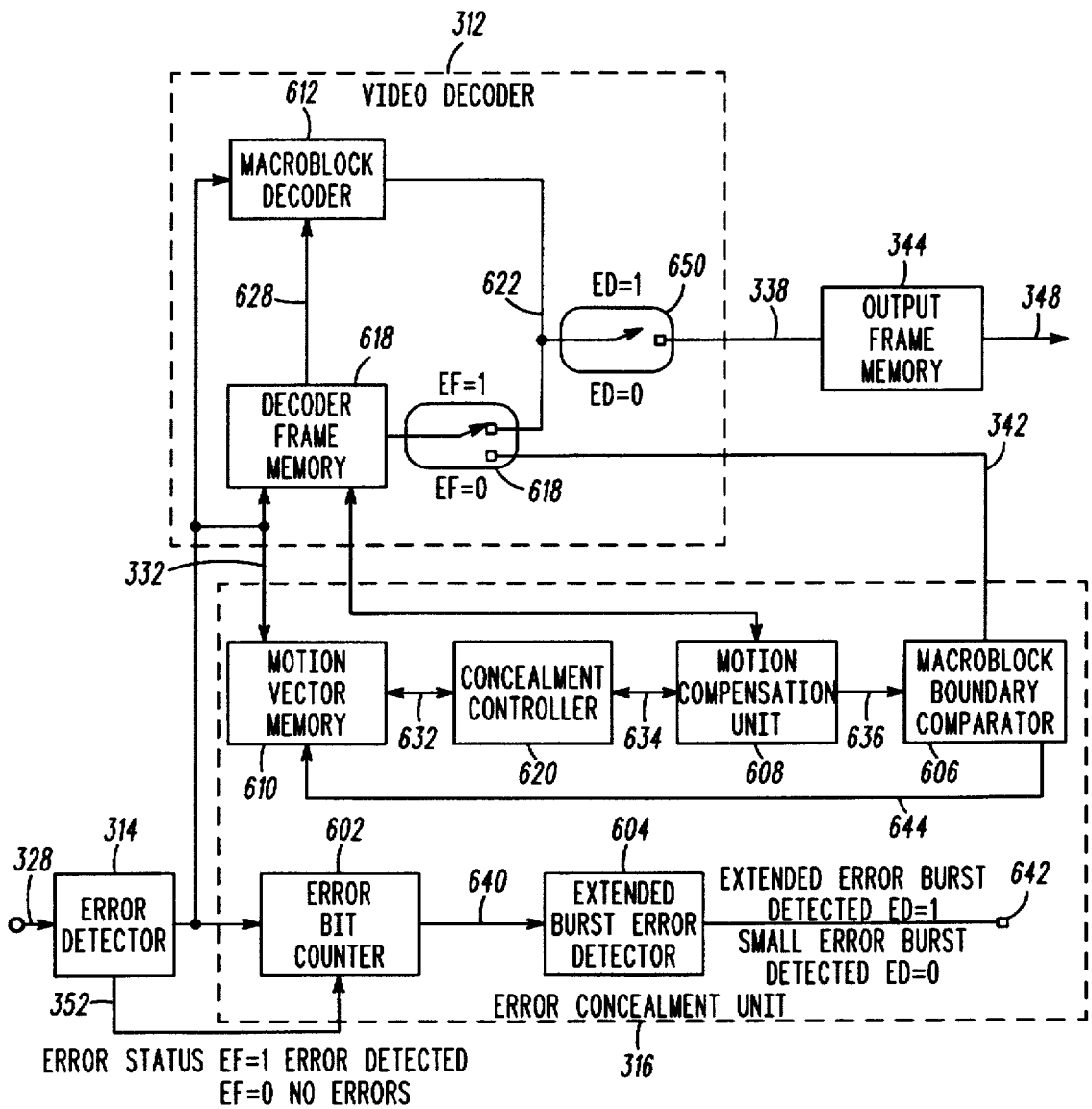
FIG. 6 is a block diagram of a device for concealing errors in a decoded video sequence in accordance with the present invention.

FIG. 6, numeral 600, is a block diagram of the video decompressor (306) which provides concealment of an error burst in accordance with the present invention. As discussed above, based on the error control information embedded in the bitstream (324) the error detector (314) determines when errors are present in the received bitstream (328). There are several approaches to detecting errors utilizing the control information. For instance, an error is detected if: a new picture start code is received before all macroblocks of the current frame are decoded; or if the entropy code words result in values that cannot possibly be obtained by the video encoder, these are called illegal code words; or if the decoded temporal reference does not agree with the previous temporal reference. Once an error is detected an error status flag, EF, is set to a value of 1 from the value of 0. The error flag EF is constantly being monitored (352) by the error bit counter (602). When EF=1 the bit error counter begins counting each received bit (330). This counting process is terminated when EF returns to a value of zero. The error flag EF is returned to zero when the error detector (314) correctly receives the next set of control information. The error flag, EF, being set to one activates (618) the error concealment unit (316).

To determine whether the error burst is extended or not the total number of bits, BE, counted by the bit error counter is sent (640) to an extended burst error detector (604). Comparing this number to a predetermined threshold, TBE, determines whether the error burst is an extended or short error burst. This threshold test is described in the following equation $$BE = \begin{cases} < TBE & ED = 0 \\ \geq TBE & ED = 1 \end{cases} \quad (1)$$

An INTRA coded frame can typically require one second worth of bits at low video bitrates. If the next control information is not correctly received within one second, it can be assumed that at least one frame has been transmitted. Thus, TBE is set, as a function of bitrate, to the number of bits transmitted over a one second period, which represents at least one current frame worth of bits.

As described above, ED=1 indicates an extended error burst has corrupted the received bitstream (328). To conceal the effects of such a burst error on the visual quality of the decoded video, the output frame memory (344) is not updated (650) until a predetermined number of frames, FN1, are decoded error-free. This predetermined number of frames, FN1, is determined by the I-macroblock scans used in the macroblock containment scan controller (308). For the scans shown in FIG. 5, FN1=17 would ensure that the center most macroblocks would be updated, while a FN1=36 would ensure all macroblocks would have been updated.

Also as described above, when EF=1 and ED=0 a short error burst concealment (316) method is used to regenerate the missing information. Concealment is especially important for this case, since if not properly concealed and contained this short error burst can cause considerable damage over an extended period. To reduce this source of degradation to the decoded video the error concealment unit (316) regenerates the motion vectors of the corrupted macroblocks. By regenerating the motion information large differences in the intensity is avoided at the macroblock boundaries. Furthermore, a macroblock which is much more correlated with the area surrounding the corrupted macroblock in the present frame will be used in place of the missing information.

The motion vectors are regenerated by creating a plurality of candidate motion vectors. This plurality of candidate motion vectors (620) is determined by the concealment controller (620) which is coupled (632) to the motion vector memory (610). The plurality of motion vectors determined by the concealment controller (620) is comprised of the motion vectors from neighboring macroblocks that have been received error-free. A neighboring macroblock is defined as a macroblock that has the smallest possible distance to the macroblock under consideration. For the case when a single macroblock is received in error, the plurality of candidate motion vectors would result from the following macroblocks: the one in row directly above, directly below, to the left, and to the right of the macroblock under consideration. Also, included is the motion vector from the macroblock of the same location in the previous frame and the zero motion vector.

Each candidate motion vector determined by the concealment controller (620) is used by the motion compensation unit (608) to obtain (654) a prediction macroblock from the previously decoded frame which is held in the decoder frame memory (616). A prediction macroblock is obtained by the motion compensation unit (608) through accessing the decoder frame memory based on the spatial location of the macroblock currently under consideration along with the motion vector. Each macroblock prediction is tested by the macroblock boundary comparator (606) along the its boundaries with the neighboring macroblocks to determine a single number indicating the quality of the match. The metric used by the macroblock boundary comparator (606) to generate this number is the mean squared error, MSE. The MSE metric used on the macroblock boundary pixels is given by $$MSE(i) = \sum_{\beta=0}^{\Delta} (Y(\beta) - P(\beta))^2, \quad (2)$$

where MSE(i) is MSE value calculated for candidate motion vector i, $\beta$ is an index to the particular boundary pixel, $\Delta$ is the maximum boundary pixel index, $Y(\beta)$ is the luminance value from the neighboring macroblock at boundary location $\beta$, and $P(\beta)$ is the luminance value from the predicted macroblock at boundary location $\beta$.

Based on the MSE, the motion vector that provides the best match along the boundaries is returned (644) to the motion vector memory (610) for the current macroblock. Furthermore, the predicted intensity for the current macroblock is placed in the decoder frame memory (616). The error flag EF is returned to zero and the error detection unit (314) continues monitoring the bitstream in anticipation of the error burst.

To further conceal the effects of a short error burst on the visual quality of the decoded video, the output frame memory (344) is also not updated (650) for this case until a predetermined number of frames, FN2, are decoded error-free. This predetermined number of frames, FN2, is typically set to 3. The device of the present invention is typically directed by a computer program that is embodied in at least one of: A) a memory; B) an application specific integrated circuit; C) a digital signal processor; and D) a field programmable gate array.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for concealment of errors occurring in a bitstream using control information for a macroblock-based video codec, where at least one previous video frame of macroblocks is stored, comprising the steps of:

A) counting bits, of a received transmission, between a plurality of bits having control information to determine whether a current frame or a portion of a current frame has been corrupted;

B) wherein if at least the current frame has been corrupted and an immediately previous frame has been buffered, the following steps are performed:

B1) determining a resynchronization bit position in the bitstream;

B2) displaying the immediately previous video frame of macroblocks at the resynchronization bit position for a predetermined number of frames;

B3) returning to step A;

C) wherein if a portion of a current frame has been corrupted, regenerating a plurality of corrupted macroblocks of the frame by the steps of:

C1) determining a pool of motion vectors for a first macroblock of the plurality of corrupted macroblocks;

C2) determining, from the pool, a motion vector that provides the macroblock from the immediately previous stored frame having a highest correlation of intensity values along borders of the macroblock in the current frame, providing a regenerated macroblock;

C3) repeating steps C1–C2 for preselected corrupted macroblocks to provide a plurality of regenerated macroblocks;

C4) displaying the regenerated macroblocks in the current frame and returning to step A.

2. The method of claim 1 wherein the pool of motion vectors includes motion vectors of neighboring macroblocks of the current frame.

3. The method of claim I wherein the highest correlation of intensity values is a mean squared error of intensity values based on at least one border of the current macroblock.

4. The method of claim 1 wherein the predetermined number of frames are provided by a predetermined intensity updating scheme.

5. The method of claim 4 wherein the predetermined intensity updating scheme includes:

A) utilizing a plurality of intra-macroblock scans to determine intensities of the macroblocks of a frame;

B) using the intensities of the macroblocks to replace the immediately previous frame.

6. The method of claim 5 wherein the plurality of intra-macroblock scans is four scans, with two of the scans being peripheral and two of the scans being central to the frame.

7. A device for containment of errors occurring in a bitstream of a macroblock-based video input, wherein the device comprises at least one of an encoder and a decoder, wherein the encoder includes a video compressor comprising:

A) a macroblock containment scan controller, coupled to receive a temporal reference and a macroblock identification number, for determining I- macroblocks to be intensity encoded;

B) a video encoder containment unit, coupled to the macroblock containment scan controller, to receive a video sequence from a frame memory and to receive a motion vector from a motion vector memory, for providing an adaptively encoded macroblock using one of a temporal predictive encoding scheme and an intra-encoding scheme in accordance with whether the macroblocks are identified as prediction macroblocks or I-macroblocks; and C) an error control unit, coupled to the video encoder containment unit, for adding error control information to the adaptively encoded macroblock;

and wherein the decoder includes a video decompressor comprising:

D) an error detector, coupled to a noisy channel, for utilizing information in a received bitstream for determining when errors are present in the received bitstream and for sending an activation signal to an error concealment unit when errors are present;

E) a video decoder, coupled to the error concealment unit and coupled to receive a temporal reference from the error detector, for, if a short burst is detected, providing motion vectors from neighboring error-free macroblocks to the error concealment unit and intensity information from a previous frame, and for, if an extended burst is detected, waiting to update an output buffer until I-macroblock scans have updated an entire video frame;

F) the error concealment unit, coupled to the error detector and the video decoder, for, in response to the activation signal, replacing corrupted information in the received bitstream with known information in accordance with a predetermined scheme; and G) the output frame memory, coupled to the video decoder, for updating an output buffer in accordance with the predetermined scheme used by the error concealment unit.

8. The device of claim 7 wherein the video encoder containment unit is comprised of:

A) a switched network, coupled to the macroblock containment scan controller, to an encoder frame memory, and to a macroblock encoder, for providing selection between two independent macroblock data sources;

B) the macroblock encoder, coupled to the switched network, for providing an encoded macroblock data source;

C) a macroblock decoder, coupled to the macroblock encoder, for decoding the encoded macroblock data source;

D) the encoder frame memory, coupled to receive a motion vector and to the macroblock decoder, for providing a predicted macroblock.

9. The device of claim 8 wherein the switched network is comprised of a first double pole single throw switch coupled to a second double pole single throw switch for providing selection between two independent macroblock data sources to an adder.

10. A device for concealment of errors occurring in a bitstream using control information for a macroblock-based video codec, where at least one previous video frame of macroblocks is stored, wherein the device is directed by a computer program that is embodied in at least one of:

A) a memory;

B) an application specific integrated circuit;

C) digital signal processor; and

D) a field programmable gate array, and the computer program includes steps of:

E) counting bits, of a received transmission, between a plurality of bits having control information to determine whether a current frame or a portion of a current frame has been corrupted;

F) wherein if at least the current frame has been corrupted and immediately previous frame is buffered, the following steps are performed:

F1) determining a resynchronization bit position in the bitstream;

F2) displaying the immediately previous video frame of macroblocks at the resynchronization bit position for a predetermined number of frames;

F3) returning to step E;

G) wherein if a portion of a current frame has been corrupted, regenerating a plurality of corrupted macroblocks of the frame by the steps of:

G1) determining a pool of motion vectors for a first macroblock of the plurality of corrupted macroblocks;

G2) determining, from the pool, a motion vector that provides the macroblock from the immediately previous stored frame having a highest correlation of intensity values along borders of the macroblock in the current frame, providing a regenerated macroblock;

G3) repeating steps G1–G2 for preselected corrupted macroblocks to provide a plurality of regenerated macroblocks;

G4) displaying the regenerated macroblocks in the current frame and returning to step E.

11. The device of claim 10 wherein the pool of motion vectors includes motion vectors of neighboring macroblocks of the current frame.

12. The device of claim 10 wherein the highest correlation of intensity values is a mean squared error of intensity values based on at least one border of the current macroblock.

13. The device of claim 10 wherein the predetermined number of frames are provided by a predetermined intensity updating scheme.

14. The device of claim 13 wherein the predetermined intensity updating scheme includes:

A) utilizing a plurality of intra-macroblock scans to determine intensities of the macroblocks of a frame;

B) using the intensities of the macroblocks to replace the immediately previous frame.

15. The device of claim 14 wherein the plurality of intramacroblock scans is four scans, with two of the scans being peripheral and two of the scans being central to the frame.

* * * * *